United States Patent [19]

Fujita et al.

[11] Patent Number: 5,006,687

[45] Date of Patent: Apr. 9, 1991

[54] METHOD FOR CUTTING STEEL PIPE PILES

[75] Inventors: Tsutomu Fujita; Hidetoshi Imura; Kohzo Akahide, all of Tokyo, Japan

[73] Assignee: Kawasaki Steel Corporation, Kobe, Japan

[21] Appl. No.: 415,073

[22] Filed: Sep. 29, 1989

[51] Int. Cl.5 .............................................. B23K 9/00
[52] U.S. Cl. ......................... 219/121.59; 219/121.44; 219/121.39; 219/78.15; 219/59.1; 266/70
[58] Field of Search ...................... 219/121.44, 121.59, 219/121.39, 121.48, 74, 75, 137 R, 121.67, 121.72, 78.15, 59.1, 60 A; 266/54, 70, 55

[56] References Cited

U.S. PATENT DOCUMENTS 4,843,208 6/1989 French ........................... 219/121.51

FOREIGN PATENT DOCUMENTS 0181762 11/1982 Japan .............................. 219/121.44

Primary Examiner—M. H. Paschall
Attorney, Agent, or Firm—Dvorak and Traub

[57] ABSTRACT

A method of cutting a steel pipe or/and junction joints in form of a steel pipe pile or interlocked steel pipe pile used, for example, in formation of an underwater foundation support, after it is completed. The method is executed in accordance with a non-contact technique or the combination of a contact technique and a non-contact technique. The method is carried out by a plasma arc cutting device or the combination of a contact type cutting grinder and non-contact type cutting device, which can effectively cut the steel pipe, with no possibility of biting of the cutting edge in the cut gap of the steel pipe.

3 Claims, 15 Drawing Sheets

METHOD FOR CUTTING STEEL PIPE PILES

BACKGROUND OF THE INVENTION

1. Field of the Invention

The present invention relates to a method and an apparatus for cutting steel pipes in form of steel pipe piles, interlocked steel pipe piles or the like after constructed when used, for example, in underwater structures near seacoast, bridge construction works, reclamation works, reparian works and so on.

2. Description of the Prior Art

Steel pipe piles or interlocked steel pipe piles are used in formation of foundation supports and/or cofferdams or sheathing boards under the ground or in the water to carry out civil work, foundation work or the like.

In general, each interlocked steel pipe pile comprises a steel pipe trunk and junction joints attached to the outer periphery of the steel pipe trunk and extending in parallel to the axis of the steel pipe. The interlocked steel pipe piles are driven by a pile driver into the ground or the bottom of the water, engaging with neighboring ones at their junction joints. The interlocked steel pipe piles may have the same function of retaining of earth or water as ordinary sheet piles so as to positively produce a working space therein.

In comparison with ordinary sheet piles, such interlocked steel pipe piles are advantageously tough against buckling at driving, flexurally rigid, light-weight, and easy to cut at any desired position of the pile due to the hollow construction thereof after completion of the work, and can be reinforced by filling therein.

Conventionally, upper excess portions of the steel pipe piles or interlocked steel pipe piles are cut off from inside after completion of the work by a cutter, for example, a rolling disc pipe cutter or a grinder cutter, or the combination thereof.

For example, a cutting device which can cut both the steel pipe trunk and junction joints of an interlocked steel pipe pile by use of a grinder cutter having means for rotating the same both in a circular course and on its axis is disclosed in Japanese Patent Publication No. 50-31239. Another cutting device including a disc cutter and a grinder cutter is disclosed in, for example, Japanese Patent Publication No. 61-33933, in which the steel pipe is cut by the disc cutter and then junction joints cut by the grinder cutter. In these techniques in which the grinder cutter is used to cut the steel pipe or the junction joints, the cutting edge of the grinder cutter is thrusted in the steel pipe or the junction joint, so that, just before the cutting work is completed, the cutter is bitten in the cut steel pipe gap due to residual stress or dead weight of the steel pipe, and consequently the cutter may be broken, causing the problems of increase of cutting cost and reduction of operativity.

A further cutting device which employs high pressure fluid injected from a water jet nozzle to cut the steel pipe trunk and the junction joints is disclosed in, for example, Japanese Patent Laid-Open Publication No. 61-87020. A still further cutting device in which the steel pipe wall is cut by a disc cutter and then the junction joints are cut by high pressure fluid is disclosed in, for example, Japanese Patent Laid-Open Publication No. 61-86122. These techniques employing water jet are useful to cut the steel pipe to which the nozzle can be brought close to inject water jet against the steel pipe, but in cutting of the junction joint, the nozzle cannot be brought close enough to the junction joint, causing reduction of the cutting capacity of water jet which results in difficulty in complete cutting and drastic increase of time required for cutting and consequently increase of cutting cost.

SUMMARY OF THE INVENTION

An object of the present invention is to provide a method of effectively and quite easily cutting steel pipes used in form of steel pipe piles or interlocked steel pipe piles at a desired level thereof after completion of the work.

Another object of the present invention is to provide an apparatus for cutting a steel pipe without contacting the pipe wall.

A further object of the present invention is to provide an apparatus for effectively cutting a steel pipe and junction joints attached thereto sequentially or simultaneously, which can eliminate any trouble of biting of a cutter in the portion to be cut and inefficient cutting of the junction joints.

A further object of the present invention is to provide an apparatus which is compact and light weight so as to be fixed in a steel pipe having a small inner diameter with no difficulty, assuring effective cutting of the steel pipe.

A still further object of the present invention is to provide an apparatus for cutting interlocked steel pipe piles, the apparatus including a grinder cutter and a non-contact type cutter, the grinder cutter being used for effectively cutting junction joints and then the non-contact type cutter used for cutting the steel pipe.

In cutting of steel pipes of steel pipe piles, interlocked steel pipe piles or the like in accordance with the present invention, cutting means is inserted into a steel pipe to be cut and operated to cut the steel pipe at a desired level thereof without contacting the pipe wall. Such non-contact type cutting means is preferably a plasma arc cutter.

In an aspect of the present invention, there is provided an apparatus comprising a casing suspended into a steel pipe to be cut; holding means extending from the casing to be engaged with the inner surface of the steel pipe; and a plasma torch provided at the central portion of the lower end of the casing. The plasma torch is pivotally movable along the inner surface of the steel pipe and can be advanced toward the inner surface of the steel pipe and retracted to the initial position.

In another aspect of the present invention, there is provided an apparatus comprising a grinder cutter provided at the lower end of a rotating shaft, the grinder cutter being under control to be advanced and retracted in the direction vertical to the axis of the rotating shaft and to be pivotally moved about the rotating shaft; non contact type cutting means such as a water jet device or a plasma arc cutter which is under control to be vertically moved along the axis of the rotating shaft, to be advanced and retracted in the direction vertical to the axis of the rotating shaft and to be pivotally moved about the rotating shaft, the rotating shaft being freely rotatably inserted in a cylindrical casing; and holding means provided on the outer periphery of the casing and adapted to fixedly position the casing within the body portion of an interlocked steel pipe pile.

DETAILED DESCRIPTION OF PREFERRED EMBODIMENTS

Figure 1:
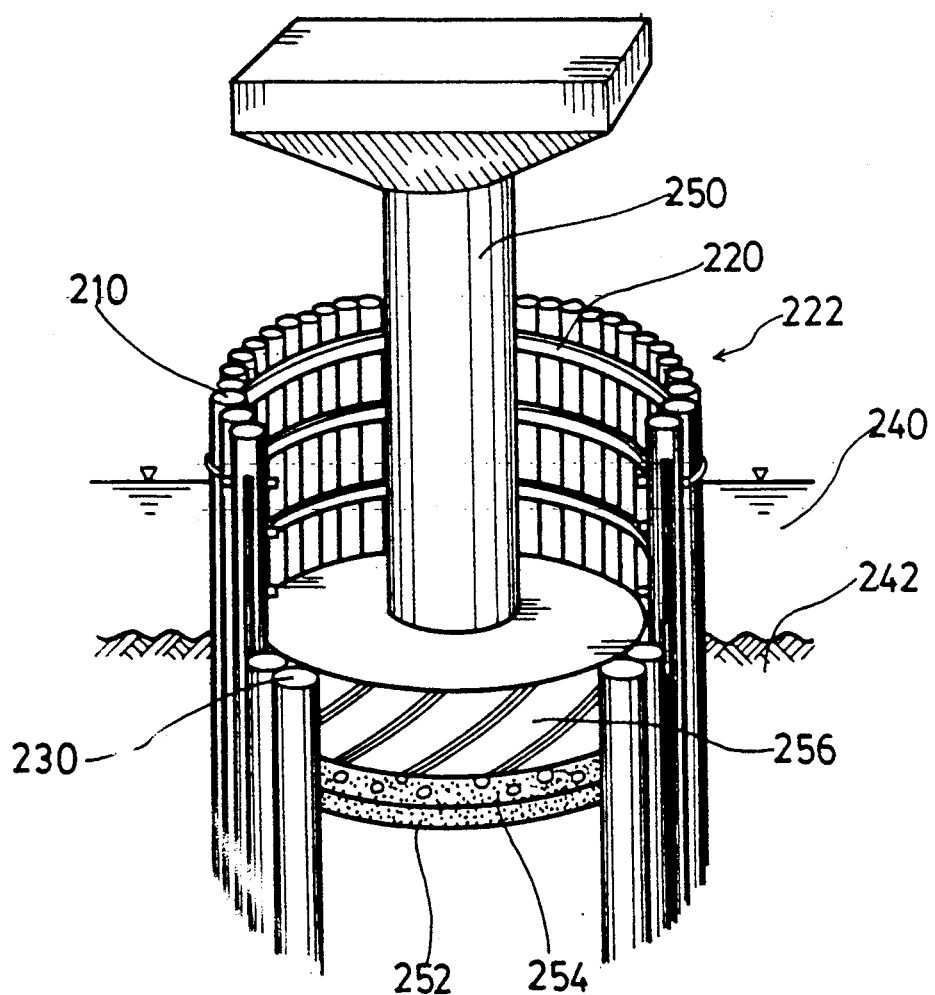
FIG. 1 is a perspective view of an example of the construction of interlocked steel pipe piles.
Figure 2:
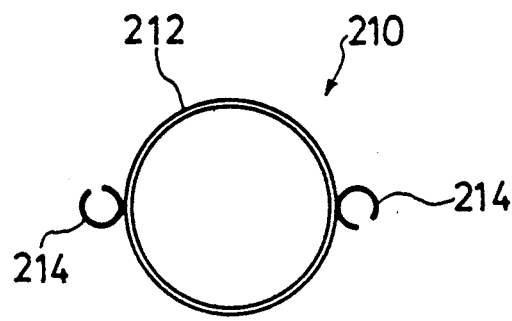
FIGS. 2a, 2b, 2c and 2d are views illustrating each a sectional configuration of an interlocked steel pipe pile.
Figure 2:
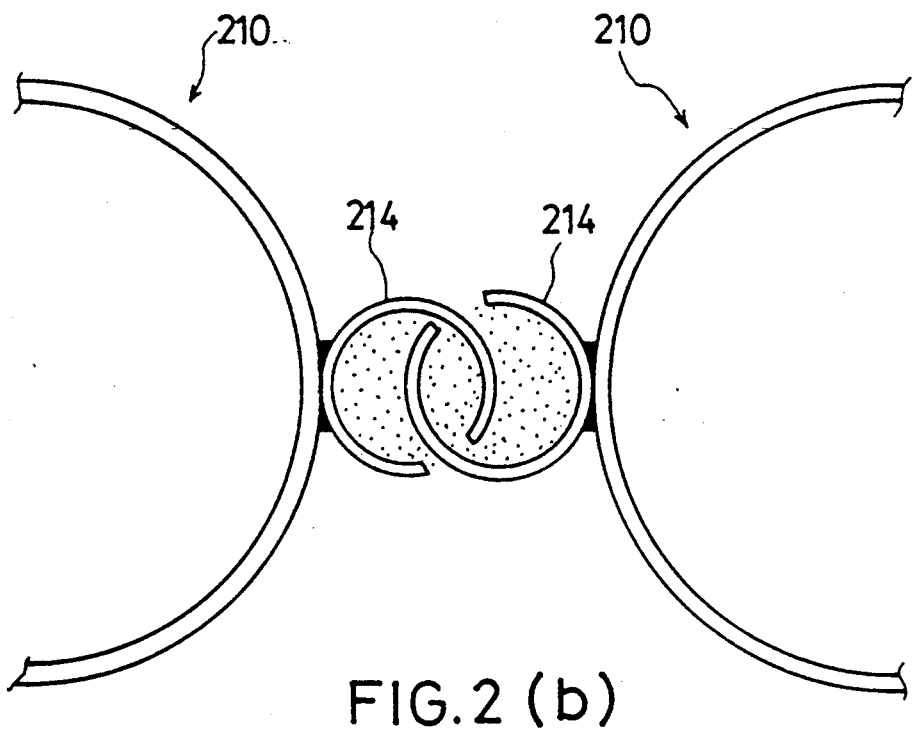
Figure 2:
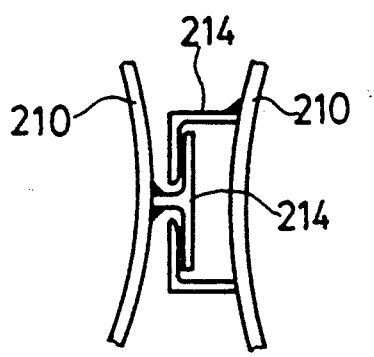
Figure 2:
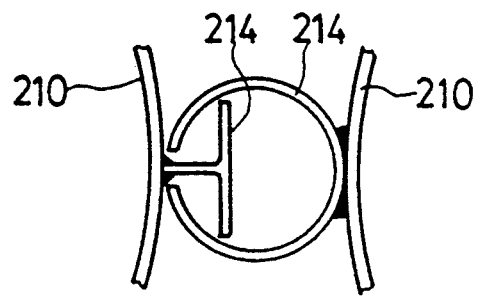

FIG. 1 illustrate a usage of interlocked steel pipe piles 210, and, for example, when a pier 250 is to be constructed in the water 240, the interlocked steel pipe piles 210 are driven side by side from above the water to a pile bearing stratum under the water bottom 242 to form a sheath wall 222. Each of the interlocked steel pipe piles 210 is composed of a steel pipe 212 and junction joints 214 attached to the steel pipe 212, as shown in FIG. 2(a), and it is driven with the junction joints 214 respectively engaged with corresponding junction joints of adjacent interlocked steel pipe piles, as shown in FIG. 2(b). FIGS. 2(c) and 2(d) show variations of junction joints respectively. Thus formed sheath wall is reinforced by supports 220, and then the junction joints 214 are filled with mortar to form a watertight cofferdam. After the cofferdam is drained off, a sand layer 252, a concrete basement 254 and a footing 256 are laid up successively to construct the pier 250. After the pier 250 is completed, upper parts of the interlocked steel pipe piles 210 are cut off at the cutting level 230 and removed.

In this cutting of the steel pipes, a contact type cutting edge may be disadvantageously bitten in a portion of the steel pipe to be cut due to the weight of the steel pipe, which will cause damage to the cutting edge, and, in this case, use of a non-contact type cutter is preferred.

In order to cut an interlocked steel pipe pile, junction joints are first cut and then the steel pipe trunk is cut. Practical two cutting procedures may be selected in such a case.

In accordance with one of the techniques, a grinding cutter is used to cut the junction joints of the interlocked steel pipe pile, and then a non-contact type cutting means is used to cut the steel pipe trunk of the interlocked steel pipe pile along a cutting line at the same level as the cutting lines of the junction joints.

It will require quite much time to cut the junction joints from the inside of the steel pipe by non-contact type cutting means, but in accordance with this technique, the junction joints is cut by the grinder cutter, before the steel pipe trunk is cut, and as the interlocked steel pipe pile keeps enough stiffness at this time, there is no fear of biting of the grinder cutter into the cut steel pipe gap due to the dead weight of the steel pipe or release of the residual stress, permitting cutting operation to be completed in a short time. Furthermore, there will be no possibility of falling down or falling in of the steel pipe pile to be cut at completion of the cutting operation of the junction joints, preventing breakage of the grinder cutter.

Thus, if cutting of the junction joints by the grinder cutter is followed by cutting of the steel pipe trunk by the non-contact type cutting means, effective cutting operation with no trouble of biting of the cutting edge can be achieved by a single combined apparatus. A disc cutter may cut a steal pipe trunk in a short time only when the pipe is remained entirely uncut, but if the junction joints have been already cut before, satisfactory cutting of the steel pipe by the disc cutter may not be expected. In this case, noncontact type cutting means can be employed to complete smooth cutting of the steel pipe with no difficulty.

In accordance with the other technique, after the junction joints are cut by a grinder cutter along cutting lines, the steel pipe is cut over the whole circumference thereof by non-contact type means at the level higher or lower than the cutting lines by the grinder cutter. The steel pipe is not necessarily cut over the whole circumference thereof, but it may be cut in two linear portions each extending from a position which does not vertically overlap the cutting line of the steel pipe cut along with the junction joint to opposite ends which vertically overlap the cutting line, and then portions of the steel pipe between the cutting line of the steel pipe cut by the non-contact type cutting means and the cutting line of the junction joints are vertically cut by a cutting means so as to communicate all of the cutting lines for complete cutting of the interlocked steel pipe pile. In this case, there is no need of means and operation for coinciding the level of the cutting lines of the steel pipe and the junction joints, and complete cutting of the interlocked steel pipe pile can be assured at any time. During cutting of the junction joints, the steel pipe trunk serves as a support, and during cutting of the steel pipe trunk, the junction joints serves as supports, so that biting of the cutter can be prevented.

EMBODIMENT 1

Now, the embodiments of the cutting apparatus of the present invention will be described with reference to the drawings.

Figure 3:
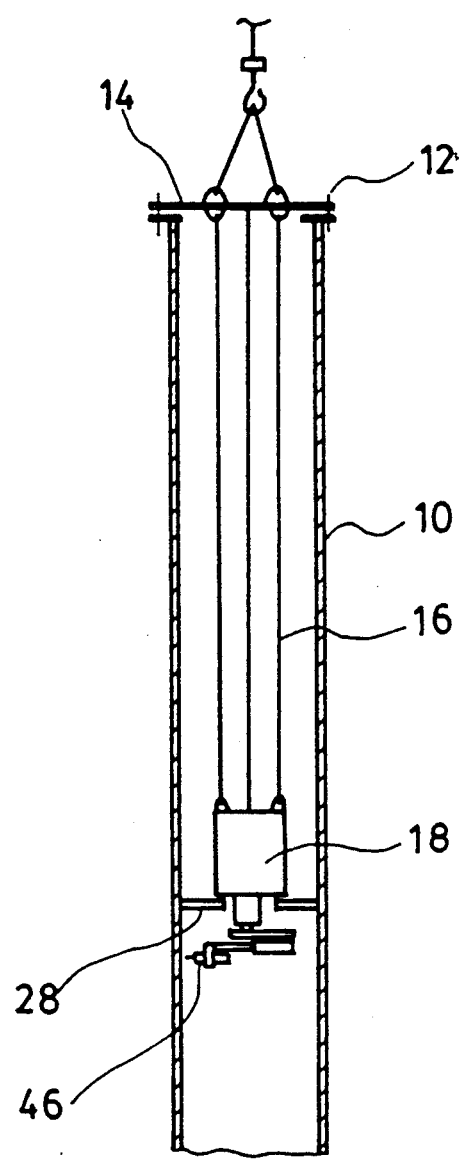
FIG. 3 is a general view of a cutting apparatus according to the first embodiment of the present invention.
Figure 4:
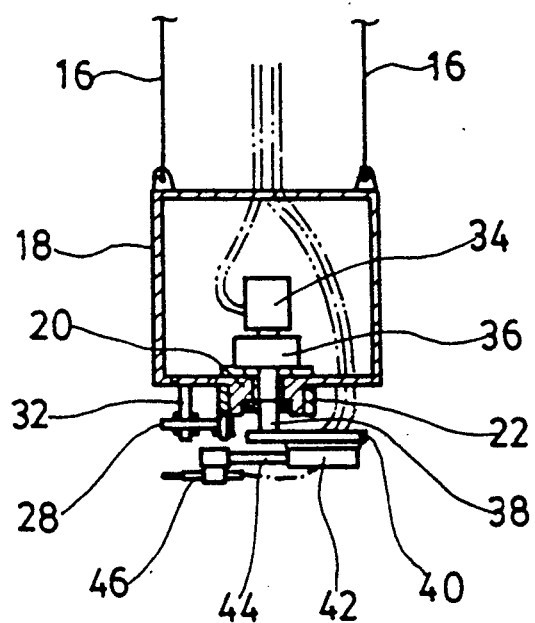
FIG. 4 is a detail view illustrating the plasma arc cutter of FIG. 3.
Figure 5:
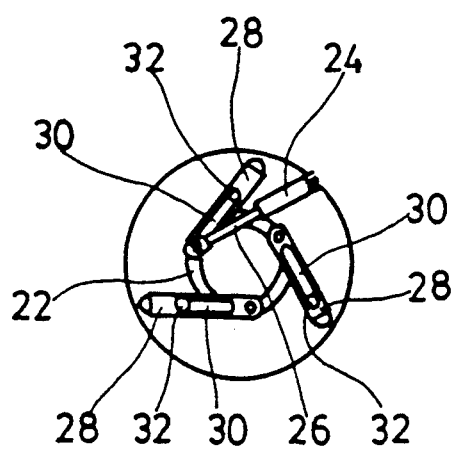
FIG. 5 is a detail view illustrating the casing holding means of FIG. 3.

Referring to FIGS. 3 to 6 in which a first embodiment of the present invention is shown, there is disposed on the upper end of a steel pipe 10 to be cut a support table 14 mounted through proper height adjusting means 12 such as a screw shaft, and a casing 18 is suspended from the support table 14 in the steel pipe 10 by suspension ropes 16, as shown in FIG. 3. As shown in FIGS. 4 and 5, the casing 18 is formed on the lower surface thereof with a central boss 20 around which a rotating ring 22 is rotatably fitted. The rotating ring 22 is rotated clockwise or counterclockwise by advancement or retract of a piston rod 26 of a hydraulic cylinder 24 mounted on the lower surface of the casing 18.

Holding members 28 are provided for fixedly positioning the casing 18 within the inner surface of the steel pipe 10 and have proximal ends secured to the rotating ring 22 at 120° intervals, respectively.

Each of the holding member 28 has at the central portion thereof a slot 30, in which one of guide pins 32 projected from the lower surface of the casing 18 at 120° intervals is fitted, so that retracting movement of the piston rod 26 of the hydraulic cylinder 24 may cause the respective distal ends of the holding members to be brought in abutment against the inner surface of the steel pipe 10.

There is disposed in the casing 18 a hydraulic or electric motor 34 and a speed reducer 36 having a rotating shaft 38 projected downwardly through the boss 20 in the lower surface of the casing 18.

A table 40 is horizontally fixed to the lower end of the rotating shaft 38 of the speed reducer 36, and a hydraulic cylinder 42 is horizontally mounted on the lower surface of the table 40.

The hydraulic cylinder 42 has a piston rod 44, and a plasma torch 46 is horizontally attached to the lower surface of the distal end of the piston rod 44, so that advancing movement of the piston rod 44 of the hydraulic cylinder 42 may cause the tip of the plasma torch 46 to be brought in the vicinity of the inner surface of the steel pipe 10.

Figure 6:
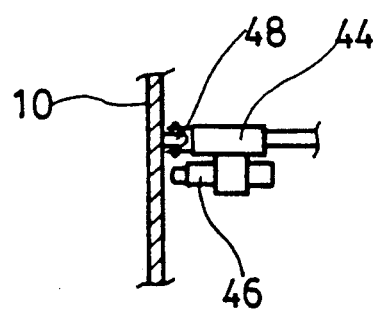
FIG. 6 is a detail view illustrating the standoff means of FIG. 3.

In order to keep an optimum and constant distance or standoff between the tip of the plasma torch 46 and the inner surface of the steel pipe 10, a positioning roller 48 is provided at the extreme end of the piston rod 44 of the hydraulic cylinder 42, as shown in FIG. 6. With this arrangement, the casing 18 is inserted into the steel pipe 10 to be cut, and the plasma torch 46 is advanced and operated to direct plasma arc therefrom, so that, as the plasma torch 46 is rotated, the steel pipe 10 may be cut at a desired level thereof. The height adjusting means 12 may be omitted by adjusting the length of the suspension ropes 16.

EMBODIMENT 2

Figure 7:
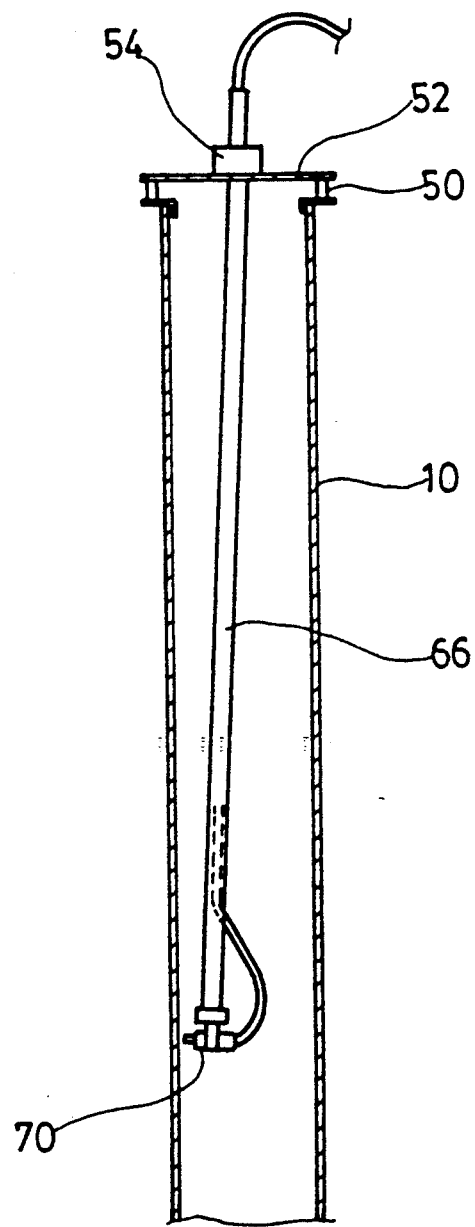
FIG. 7 is a general view of the cutting apparatus according to the second embodiment of the present invention.
Figure 8:
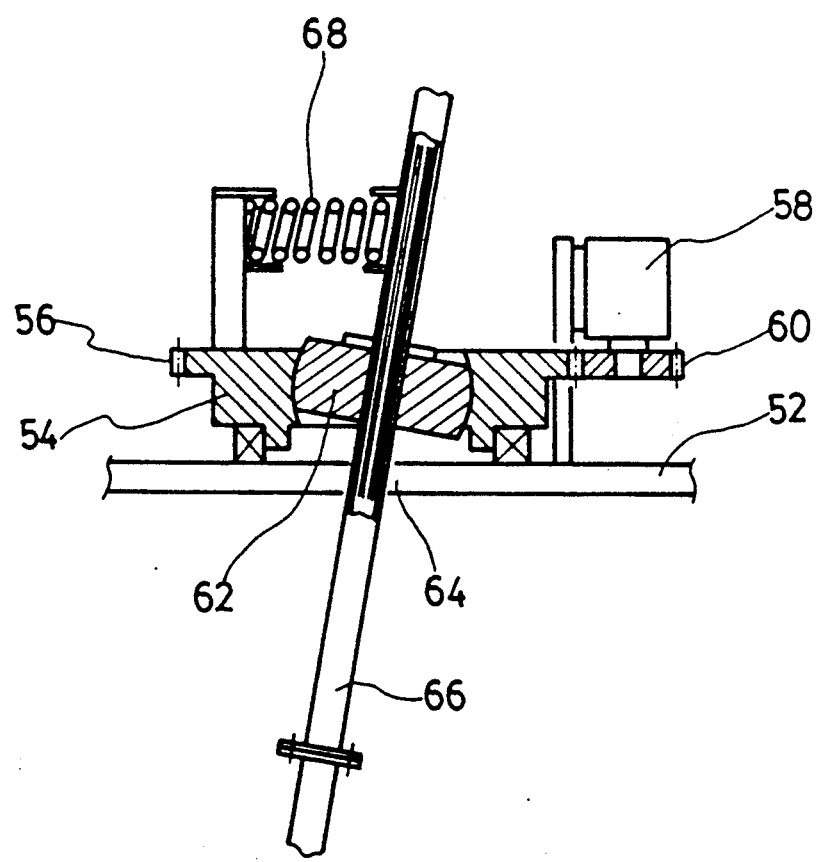
FIG. 8 is a detail view of the support rod tilting means.

Referring now to FIGS. 7 to 10 in which a second embodiment of the present invention is shown, there is disposed on the upper end of a steel pipe 10 to be cut a support table 52 mounted through proper height adjusting means 50 such as a screw shaft, and a disc member 54 is mounted on the central portion of the support table 52 and is rotatable in a plane, as shown in FIGS. 7 and 8.

The disc member 54 is formed on the outer periphery thereof with a gear 56 which is in mesh with a pinion gear 60 on the rotating shaft of a hydraulic or electric motor 58 disposed on the support table 52.

A tilting member 62 is tiltingly movably fitted in the central portion of the disc member 54. A support rod 66 is inserted through the central portion of the tilting member 62 and extends long downwardly through a central hole 64 of the support table 52.

There is provided between the upper end of the support rod 66 and the disc member 54 tiltingly urging means 68 such as a coil spring for tilting the support rod 66 at a desired angle. A plasma torch 70 is provided at the lower end of the support rod 66.

Standoff adjustment of the plasma torch 70 can be achieved by the tiltingly urging means 68.

Figure 9:
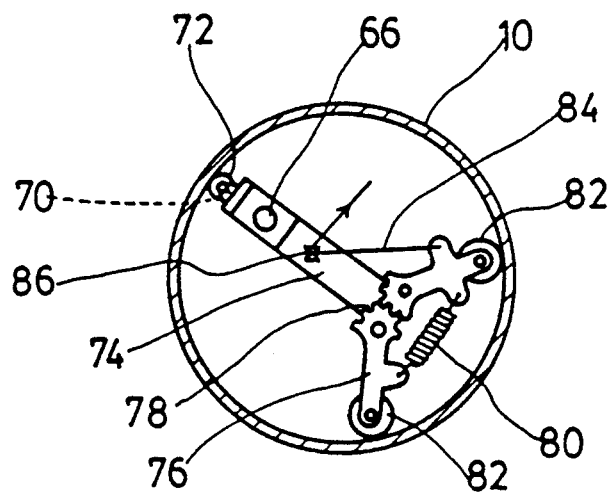
FIG. 9 is a view of another embodiment of the tilting means.

Preferably, a positioning roller 27 is mounted on the upper surface of the plasma torch 70, as shown in FIG. 9, so as to keep the standoff optimum and constant.

In place of the tiltingly urging means 68 as described above, another means for keeping the standoff of the plasma torch constant as shown in FIG. 9 may be used which includes a support plate 74 attached to the lower end of the support rod 66 and having a front end to which the positioning roller 72 is attached and a rear end to which closing members 76 arranged in form of a yoke are pivotally attached with respective gear end portions 78 thereof meshed with each other. A coil spring 80 is provided between the other ends of these closing members 76 so as to normally urge the closing members 76 in the closing direction. Rollers 82 are attached to the other ends of the closing members to be engaged with the inner surface of the steel pipe 10, so that the standoff of the plasma torch 70 may be kept constant by cooperation of the three members composed of the rollers 82 and the positioning roller 72.

Figure 10:
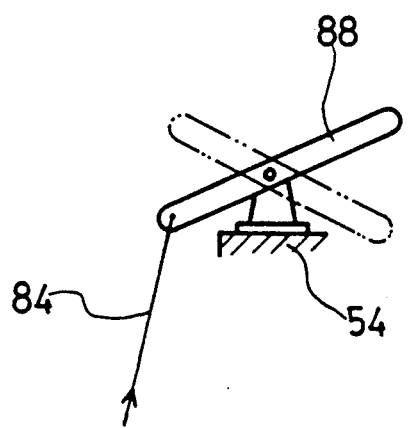
FIG. 10 is a view illustrating the control level of FIG. 7.

In this case, a control cable 84 may be attached to the other end of one of the closing members 76 and extend through a guide roller 86 on the support plate 74 to be connected to a lever 88 provided on the disc member 54, as shown in FIG. 10, so that, during insertion of the plasma torch 70 into the steel pipe 10, the closing members 76 may be kept in the open position through control of the level 88 to disengage the rollers 82 from the inner surface of the steel pipe 10 so as to facilitate insertion of the plasma torch 70.

For example, when plasma arc generated by oxygen plasma of 150 V and 250 A was used to cut a steel pipe having a length under water of 15 m, outer diameter of 1500 mm and thickness of 25 mm, the cutting speed in water was 600 mm/min. and the steel pipe was completely cut in about 7 minutes.

As described above, according to the present invention, steel pipes in form of erected steel pipe piles or interlocked steel pipe piles can be quite easily cut in a short time, permitting effective elimination of unnecessary portions of the steel pipes.

The plasma arc cutting means may be either a movable plasma arc system or an unmovable plasma arc system, that is, a plasma jet system.

EMBODIMENT 3

Figure 11:
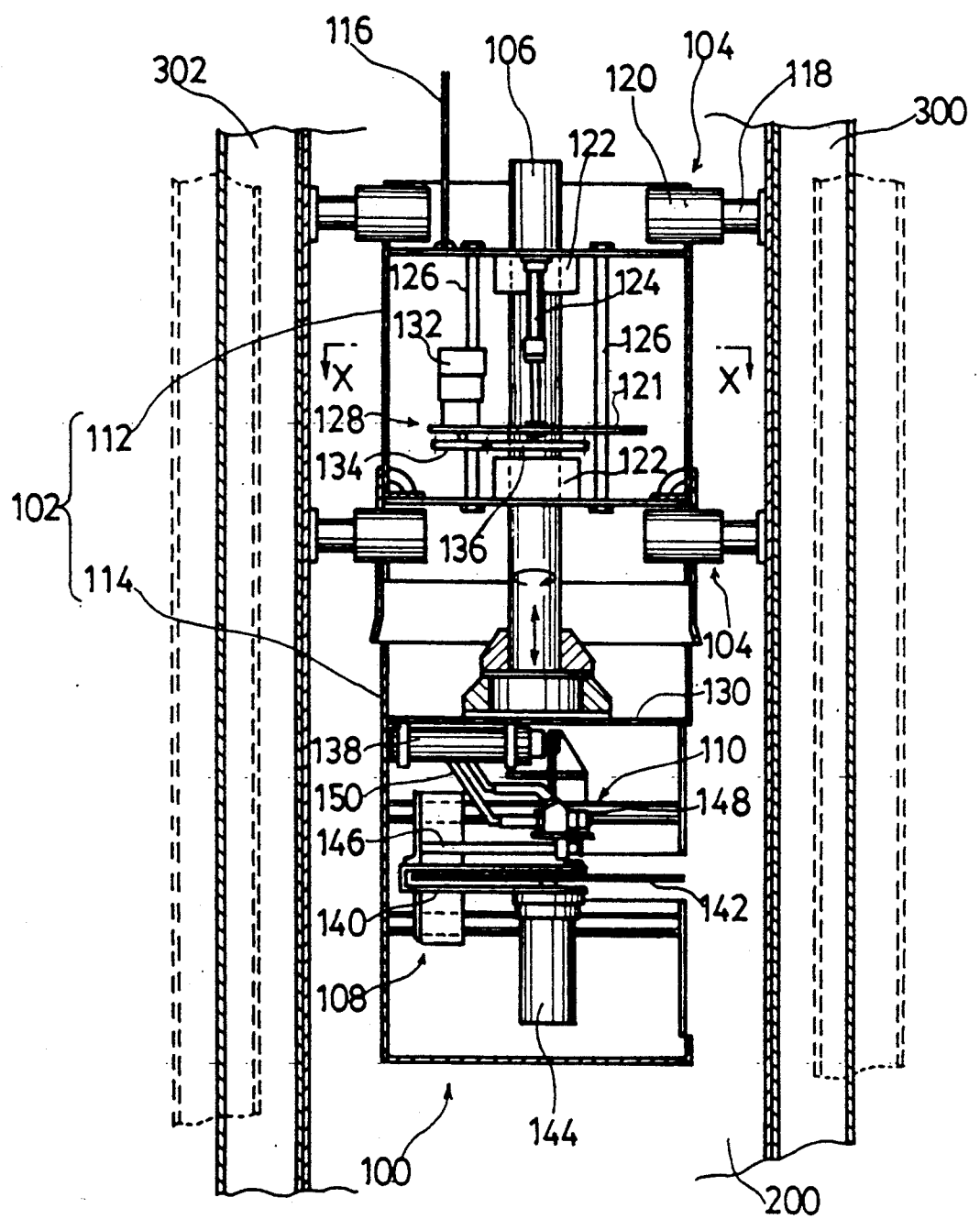
FIG. 11 is a longitudinal sectional view of the cutting apparatus according to the third embodiment of the present invention.

In FIG. 11, a cutting apparatus 100 of the present invention comprises a casing 102, holding means 104 for fixedly positioning the casing within the inside of the steel pipe 200 of an interlocked steel pipe pile, a rotating shaft 106 freely rotatably inserted in the casing 102, grinder cutter means 108, and a water jet device 110 constituting non-contact type cutting means. The grinder cutter means 108 and the water jet device 110 are supported under control to be vertically moved along the axis of the rotating shaft 106, to be advanced and retracted in the direction vertical to the axis of the rotating shaft 106 and to be pivotally moved about the rotating shaft 106.

The casing 102 is composed of a cylindrical upper casing member 112 and a cylindrical lower casing member 114, and a suitable lifting lug 116 is attached to the upper portion of the upper casing member 112.

The holding means 104 includes abutments 118 disposed at a plurality of upper and lower portions of the outer periphery of the upper casing member 112 and adapted to be advanced and retracted in the direction vertical to the axis of the casing 102.

In this embodiment, the abutments 118 are driven by respective hydraulic cylinders 120 and disposed at three positions in each of upper and lower portions of the upper casing member 112.

Figure 12:
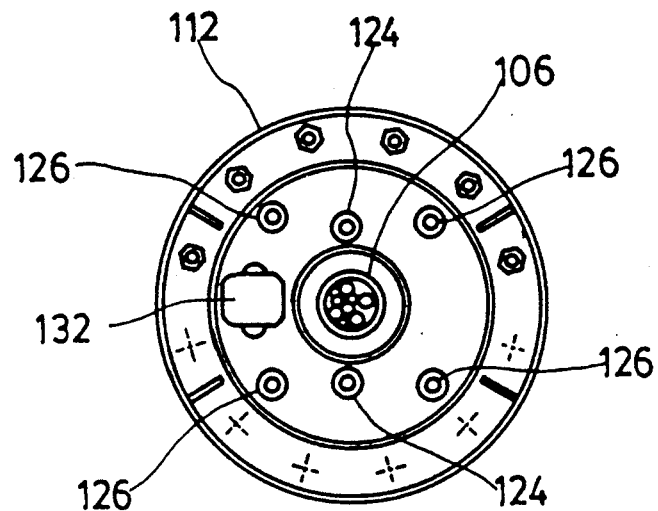
FIG. 12 is a sectional view taken along line X—X in FIG. 11.

The rotating shaft 106 is loosely fitted in a member 121 for vertical movement and a bearing 122 for pivotal movement which are longitudinally aligned. The rotating shaft 106 is supported under control to be vertically and pivotally moved by two hydraulic cylinders 124 (only one is shown in FIG. 11 but the other is also shown in FIG. 12) for vertical movement of the rotating shaft, slide guides 126, a pivotal movement drive 128 and various control means (not shown). The rotating shaft 106 is connected at the lower end thereof to a circular plate 130 fitted in the lower casing member 114.

The pivotal movement drive 128 includes a motor 132, a pinion 134 and a gear 136.

Figure 13:
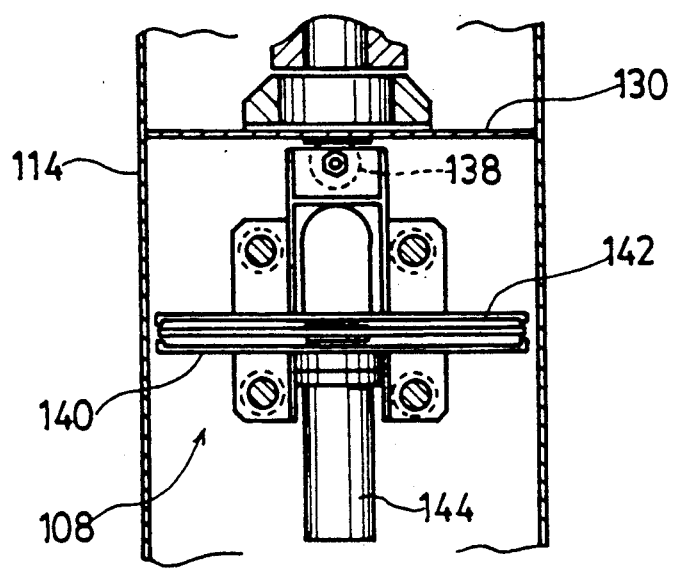
FIG. 13 is a front view of the grinder cutter in FIG. 11.

As shown in FIGS. 11 and 13, the grinder cutter means 108 includes a grinder cutter 142 disposed in a slide box 140 and controlled to be advanced and retracted by a hydraulic cylinder 138 for advancing and retracting movement of the grinder cutter and control means (not shown), and a motor 144 provided in the lower casing member 114 and adapted to rotate the grinder cutter 142.

The water jet device 110 is disposed on the slide box 140 and controlled to be advanced and retracted by a hydraulic cylinder 146 for advancing and retracting movement of the nozzle and control means (not shown). The water jet device 110 has at the distal end thereof a water jet nozzle 148, and two tubes 150 are connected to the rear portion of the water jet device 110 to supply high pressure water and abrasive material from outside.

The high pressure water and abrasive material are supplied under pressure from a booster (not shown) disposed on the ground through the tubes 150.

With this arrangement, a typical example of operation of the above cutting apparatus of the present invention will be related.

The lifting lug 116 is threaded with a wire or the like to suspend the cutting apparatus 100, so that the cutting apparatus 100 may be gradually inserted into the steel pipe 200 from the upper end thereof. When the grinder cutter 142 is lowered to a position of the steel pipe 200 to be cut, the abutments 118 constituting the holding means 104 are pushed out by the respective hydraulic cylinders 120 to be pressed against the inner surface of the steel pipe 200, and thus, the cutting apparatus 100 is fixedly positioned within the steel pipe 200 and kept in this condition, until the cutting operation is completed.

Then, after the grinder cutter 108 is set at a predetermined position so as to cut a junction joint 300, the grinder cutter 142 is driven for rotation, and the hydraulic cylinder 138 for advancing and retracting movement of the grinding cutter 142 is operated to push the slide box 140 toward the corresponding inner surface portion of the steel pipe 200, so that the grinder cutter 142 may be advanced close to the inner surface of the steel pipe 200, and then, the portion of the steel pipe 200 is cut and, further, the junction joint 300 is cut.

Preferably, an angular position detector (not shown) is provided for adjusting the rotating shaft 106 so as to achieve accurate cutting operation.

After the junction joint 300 is cut, the grinder cutter 142 is retracted and the rotating shaft 106 is rotated through 180°. Then, the grinder cutter 142 is advanced to cut the opposite portion of the steel pipe 200 and the other junction joint 302.

Then, the slide box 140 is returned to the initial position, and rotation of the grinder cutter 142 is stopped.

As the grinder cutter 142 is superior to the water jet device 110 in cutting cost and cutting efficiency, it is advantageous that, after the junction joint 300 is cut, the rotating shaft 106 is rotated through 90° to cut a portion of the steel pipe 200 and thereafter the other junction joint 302 by the grinder cutter 142, and then the rotating shaft 106 is further rotated through 90° in the same direction to cut another portion of the steel pipe 200 by the grinder cutter 142.

After the junction joints 300, 302 and the portions of the steel pipe 200 are cut, the grinder cutter 142 is retracted, and the hydraulic cylinder 124 for vertical movement of the rotating shaft 106 is operated to vertically move the rotating shaft 106 by the distance between the water jet nozzle 148 and the grinder cutter 142, so that the water jet nozzle 148 may come to the level of the cutting line of the junction joint 300. The hydraulic cylinder 146 for advancing and retracting movement of the nozzle is operated to push the water jet nozzle 148 toward the inner surface of the steel pipe 200, so that the water jet nozzle 148 may be advanced close to the inner surface of the steel pipe 200. As the rotating shaft 106 is rotated, high pressure water and abrasive material are supplied through the tubes 50 to the water jet device 110 to be mixed therein to form high pressure fluid which is injected from the water jet nozzle 148 against the inner surface of the steel pipe 200 so as to circumferentially cut portions of the steel pipe 200 which have not been cut by the grinder cutter 142.

The start position of cutting by the water jet device 110 is generally determined by a sensor using ultrasonic wave or the like or the cutting conditions by the grinder cutter 142 and the diameter of the grinder.

When cutting of the steel pipe 200 is completed, supply of the high pressure fluid is stopped, and the water jet device is returned to the initial position, with the whole operations being returned to the initial conditions.

Though the high pressure fluid to be supplied to the water jet device 110 is the mixture of high pressure water and abrasive material in this embodiment, it may be simply high pressure water or any other fluid.

Now, the description will be related to another typical example of operation of the above cutting apparatus for cutting an interlocked steel pipe pile in accordance with the present invention, and details which have been already described in connection with the above example will be omitted.

First, the cutting apparatus 110 is fixed at a predetermined position within the steel pipe 200, and the grinder cutter 142 is used to cut both of the junction joints 300 and 302.

The slide box 140 is returned to the initial position and rotation of the grinder cutter 142 is stopped.

Then, the water jet device 110, with no vertical adjustment thereof, is pushed toward the inner surface of the steel pipe 200, and high pressure fluid is injected from the water jet nozzle 148 to circumferentially cut the steel pipe 200, while the rotating shaft 106 is rotated.

Figure 14:
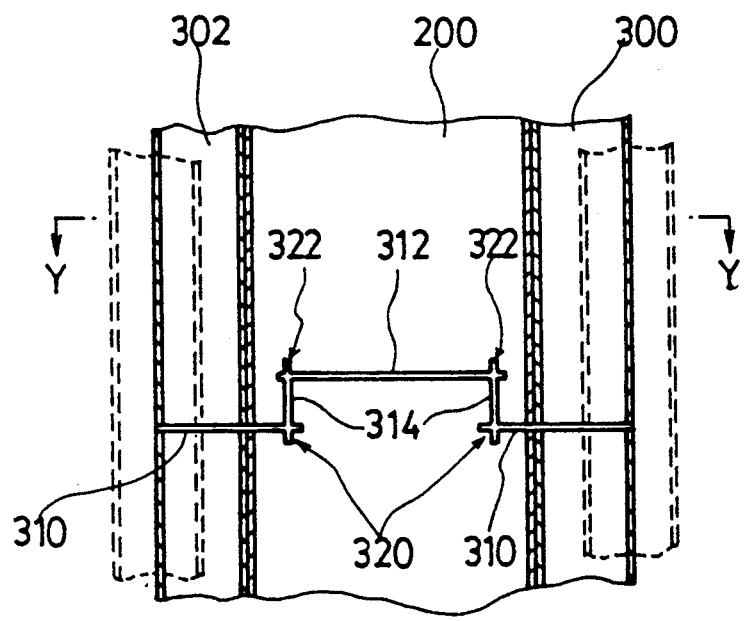
FIG. 14 is a view illustrating cutting lines in cutting a interlocked steel pipe pile.
Figure 15:
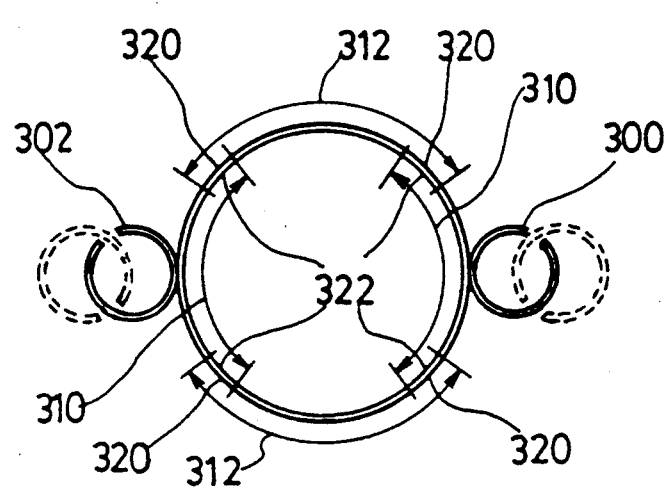
FIG. 15 is a sectional view taken along line Y—Y in FIG. 14.

The circumferential cutting is executed over the whole circumference of the steel pipe 200 or may be in two linear portions 312 each extending from a position which does not vertically overlap the cutting line 310 of the steel pipe 200 cut along with the junction joint 300 or 302 to opposite ends (322 in FIGS. 14 and 15) which vertically overlap respective ends (320 in FIGS. 14 and 15) of the cutting lines 310.

When the circumferential cutting of the steel pipe 200 is completed, injection of the high pressure fluid from the water jet nozzle 148 is stopped, and rotation of the rotating shaft 106 is stopped.

In order to communicate all of the cutting lines by vertically cutting a portion of the steel pipe between the end 320 of the cutting line 310 by the grinder cutter 142 and the circumferential cutting line 312 of the steel pipe 200, the hydraulic cylinder 124 for vertical movement of the rotating shaft and the pivotal movement drive 128 are operated to move the water jet device 110 to a desired position, where, while the hydraulic cylinder 124 is operated to vertically move the rotating shaft 106, high pressure fluid is injected from the water jet nozzle 148 to vertically cut a portion (314 in FIG. 14) of the steel pipe 200.

The above vertical cutting operation is repeated at four positions to communicate the whole cutting lines, and now cutting of the interlocked steel pipe pile is completed.

Then, supply of the high pressure fluid is stopped, and the water jet device 110 is returned to the initial position, with all operations being returned to the initial conditions.

EMBODIMENT 4

Figure 16:
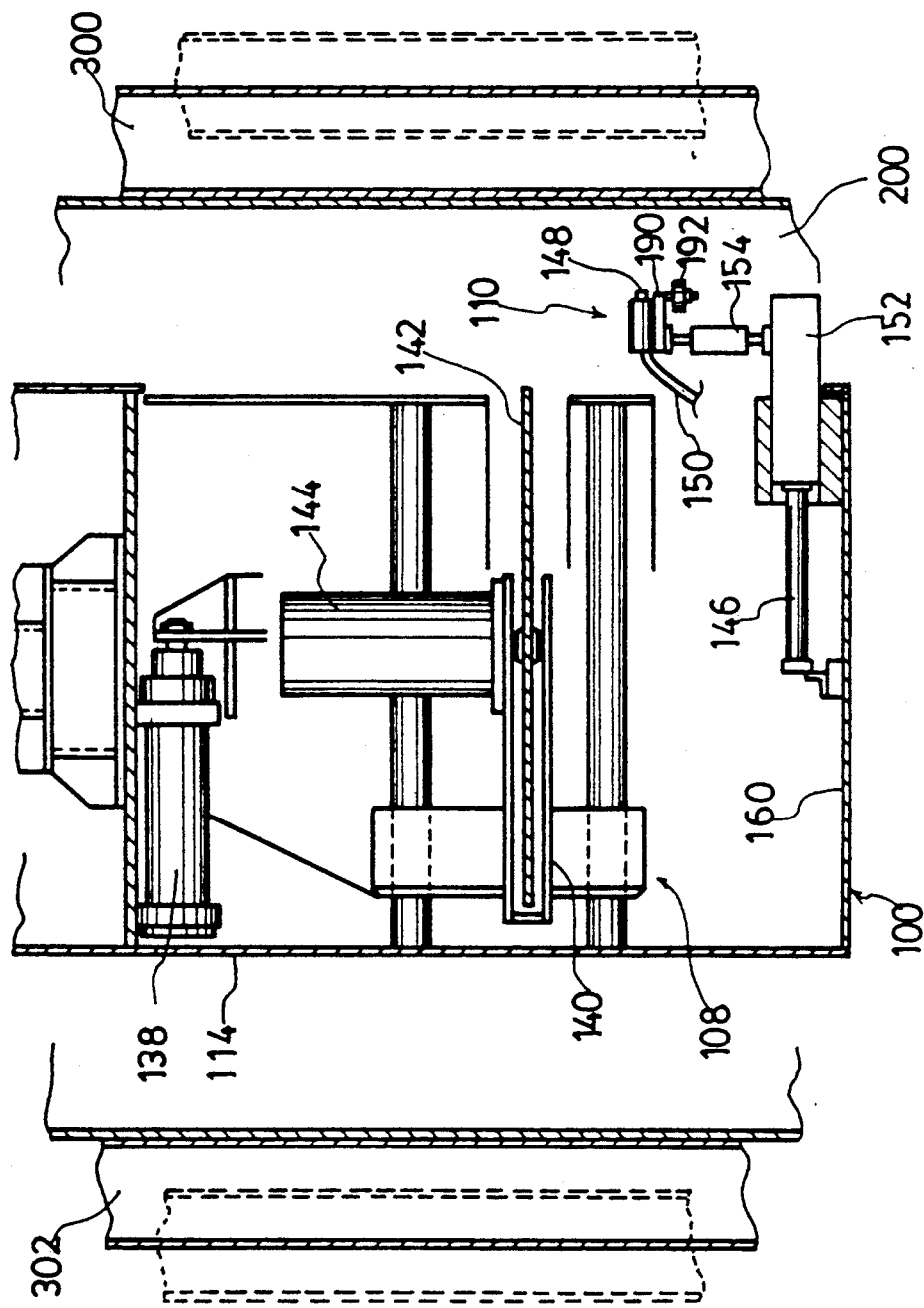
FIG. 16 is a fragmentary longitudinal sectional view of the cutting apparatus according to the fourth embodiment of the present invention.

Now, a fourth embodiment of the cutting apparatus for cutting an interlocked steel pipe pile in accordance with the present invention will be described with reference to FIG. 16, which is a longitudinal sectional view of the grinder cutter means 108 and the water jet device 110 of the cutting apparatus 100 fixedly positioned in the steel pipe 200.

A slide plate 152 is disposed on a bottom plate 158 of the lower casing member 114 and controlled to be advanced and retracted by a hydraulic cylinder 146 for advancing and retracting movement of the nozzle.

The slide plate 152 carries on the distal end thereof the water jet device 110 through a hydraulic cylinder 154 for vertical movement of the nozzle.

As the portions including the grinder cutter means 108 except the above mentioned differences are the same as described in connection with the above embodiments, any further description will be omitted.

In this case, the hydraulic cylinder 124 for vertical movement of the rotating shaft 106, the bearings 121 for vertical movement of the rotating shaft 106 and the slide guides 126 can be omitted.

The cutting apparatus of this embodiment operates as follows.

The cutting device 100 is inserted into the steel pipe 200 from the upper end thereof, and when the grinder cutter 142 is lowered to a predetermined position of the steel pipe 200 to be cut, the cutting apparatus 100 is fixedly engaged with the inner surface of the steel pipe 200.

After the grinder cutter 142 is operated to cut both of the junction joints 300, 302, the slide box 140 is returned to the initial position and rotation of the grinder cutter 142 is stopped.

Then, the hydraulic cylinder 146 for advancing and retracting movement of the nozzle is operated to push the slide plate 152 toward the inner surface of the steel pipe 200, so that the water jet device 110 may be advanced close to the inner surface of the steel pipe 200. The hydraulic cylinder 154 for vertical movement of the nozzle is operated to adjust the water jet nozzle 148 to the level of the cutting line of the junction joint 300 by the grinder cutter 142, and while the rotating shaft 106 is rotated, high pressure fluid is injected from the water jet nozzle 148 to circumferentially cut portions of the steel pipe 200 which have not been cut by the grinder cutter 142.

Alternatively, the steel pipe 200 and the junction joints 300, 302 are cut in separate cutting lines, and the portions of the steel pipe 200 between the cutting lines are vertically cut by the water jet device 110 so as to communicate all of the cutting lines.

In each of the above mentioned embodiments, when the cutting apparatus 100 is inserted into the steel pipe 200, compressed air is supplied to the abrasive material supply tubes 150 through an abrasive material supply device (not shown) so as to prevent intrusion of water through the water jet nozzle 148 which will cause moistening of the inside of the water jet device 110.

Furthermore, moistening of the inside of the water jet device 110 will be effectively prevented by coating the water jet nozzle 148 with a waterproof cover which can be opened by injection of the high pressure fluid.

Provision of a roller 192, for example, at the distal end of the mounting plate 190 for the non-contact type cutting means will effectively absorb distortion or unevenness of the inner peripheral surface of the steel pipe.

EMBODIMENT 5

Figure 17:
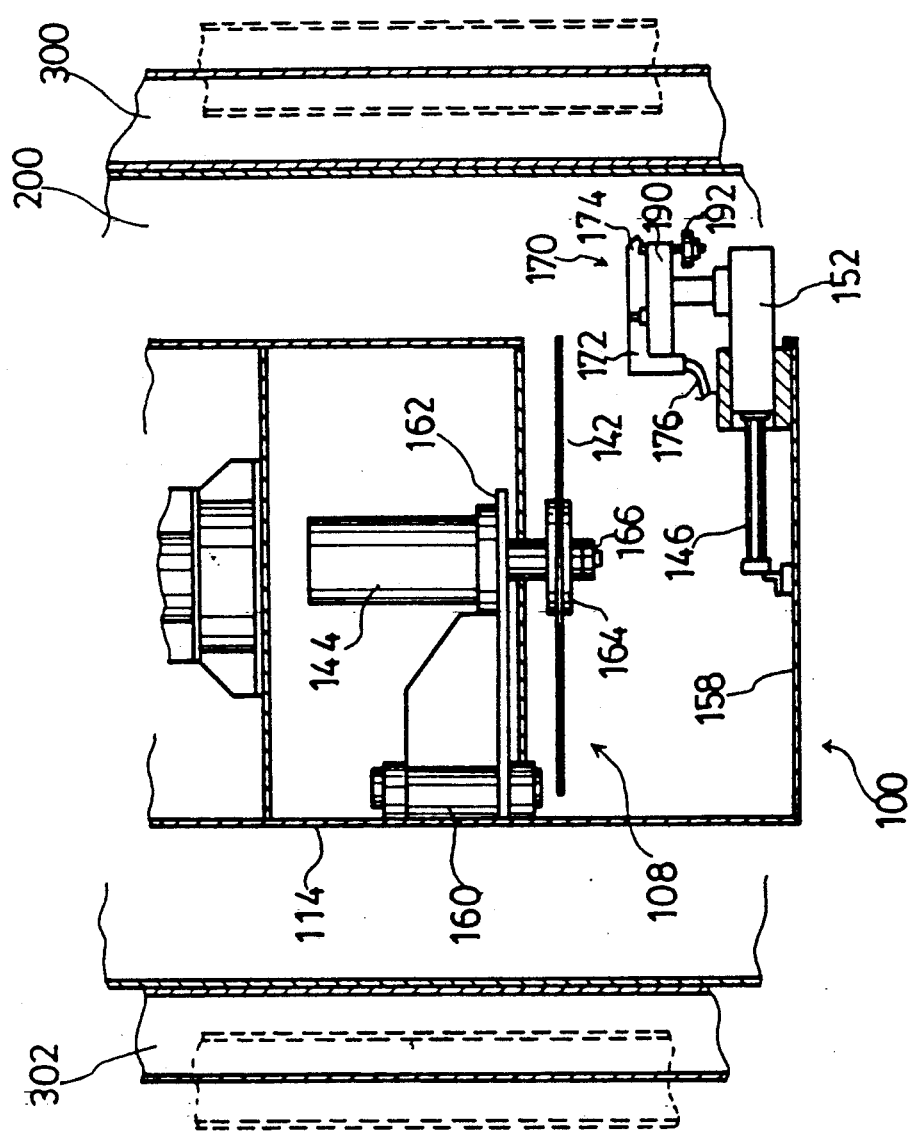
FIG. 17 is a fragmentary longitudinal sectional view of the cutting apparatus according to the fifth embodiment of the present invention.
Figure 18:
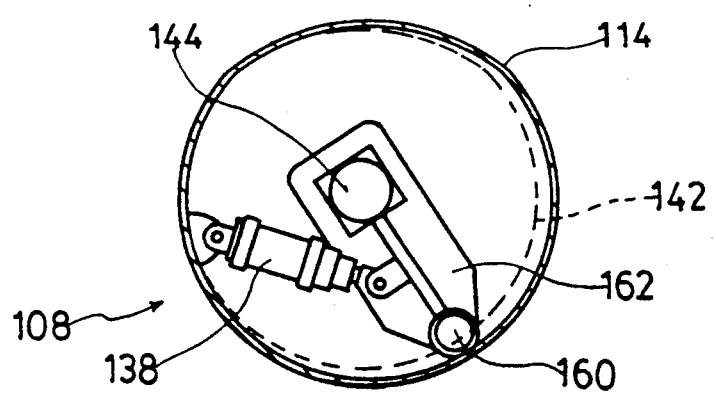
FIG. 18 is a plan view of the grinder cutter of FIG. 17.
Figure 19:
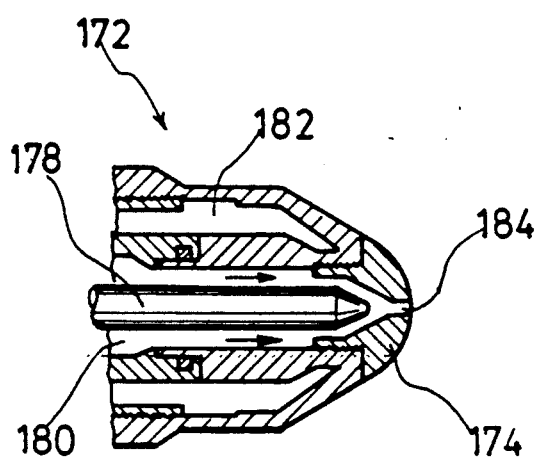
FIGS. 19 and 20 are exemplar sectional views respectively of the extreme end of the plasma torch in the plasma arc cutter.

Now, the description will be related to a fifth embodiment of the cutting apparatus for cutting an interlocked steel pipe pile in accordance with the present invention with reference to FIGS. 17, 18 and 19, in which FIG. 17 is a longitudinal sectional view of the grinder cutter means 108 and a plasma arc cutter 170 and FIG. 18 is a plan view of the grinder cutter means 108.

As shown in FIGS. 17 and 18, there is provided on the inner surface of the lower casing member 114 a support shaft 160 to which an end of a support table 162 is pivotally attached. A motor 144 for driving the grinder cutter 142 for rotation is carried on the other end of the support table 162, and the grinder cutter 142 is supported below the other end of the support table 162 through a retainer 164 in such a manner that the rotating axis of the cutter may extend vertically.

The grinder cutter 142 can be controlled to be pivotally moved about the support shaft 160 through the support table 162 by a hydraulic cylinder 138 having one end secured to the inner surface of the lower casing member 114 and adapted for advancing and retracting the grinder cutter.

As shown in FIG. 17, the plasma arc cutter 170 is carried on the distal end of the slide plate 152 which can be advanced and retracted by the hydraulic cylinder 146 disposed on the bottom plate 158 of the lower casing member 114 and adapted for advancing and retracting the plasma torch. The plasma arc cutter 170 has a nozzle 174 provided at the tip of the plasma torch 172 and a cable 176 connected to the rear portion thereof for supplying electric power, plasma gas and cooling water. As shown in FIG. 19 the tip portion of the plasma torch 172 includes an electrode 178, a plasma gas passage 180 and a water cooling portion 18, and the plasma gas passage 180 communicates with a nozzle hole 184.

Figure 20:
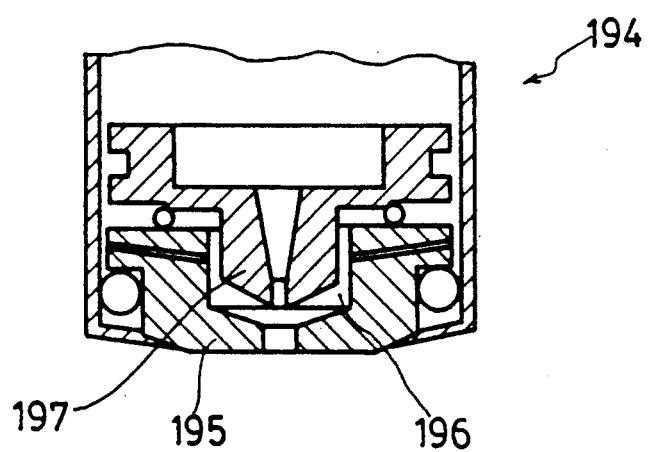

FIG. 20 illustrates a plasma arc torch 194 which is excellent for use in sea water. In case of cutting by an ordinary plasma arc torch in sea water, a series arc phenomenon will occur according to a high electric conductivity of the water. The phenomenon, producing an excess arc from the front end of the nozzle, would lower cutting efficiency and extremely injure the nozzle tip. The torch 194 provides a heat-resisting and non-electroconductive nozzle tip 195 of ceramics at the outlet and high pressure oxidizing water or gas flow path 196 surrounding the plasma arc nozzle 197. Accordingly the plasma arc torch 194 is preferably used in sea water which may completely prevent the phenomenon.

The cutting apparatus of the above arrangement operates as follows. As cutting operation of the junction joint 300 by the grinder cutter means 108 is almost the same as described in connection with the third embodiment, any further description will be omitted, but it is to be noted that in the embodiment of FIG. 18, the grinder cutter 142 is advanced and retracted in an arcuate path and not in a straight path.

After the junction joint 300 is cut, the grinder cutter 142 is returned into the lower casing member 114, and the hydraulic cylinder 124 for vertical movement of the rotating shaft is operated to adjust the nozzle 174 of the plasma torch 172 to the level of the cutting line of the junction joint 300. The hydraulic cylinder 146 for advancing and retracting movement of the nozzle is operated to push the plasma arc cutter 170 toward the inner surface of the steel pipe 200, so that the nozzle 174 may be advanced close to the inner surface of the steel pipe 200, and while the rotating shaft 106 is rotated, plasma arc is directed from the nozzle hole 184 against the inner surface of the steel pipe 200 to circumferentially cut portions of the steel pipe 200 which have not been cut by the grinder cutter 142.

Alternatively, the steel pipe 200 and the junction joints 300, 302 are cut in separate cutting lines, and the portions of the steel pipe 200 between the cutting lines are vertically cut by the plasma arc cutter 170 so as to communicate all of the cutting lines.

The starting point of cutting by the plasma arc cutter 170 can be detected by a cutting position detector (not shown).

Various operations of all of the hydraulic cylinder 124 for vertical movement of the rotating shaft, the drive 128 for pivotal movement of the rotating shaft, the hydraulic cylinder 138 for advancing and retracting movement of the grinder cutter, the hydraulic cylinder 146 for advancing and retracting movement of the nozzle and others can be controlled by conventional control means.

Though, in the above mentioned embodiments, the grinder cutter 108 is supported under control to be vertically moved along the axis of the rotating shaft 106, it will be understood that the grinder cutter may not be under control for vertical movement along the axis of the rotating shaft 106.

Provision of the roller 192 at the distal end of the mounting plate 190 for the non-contact type cutting means as shown, for example, in FIG. 17 is advantageous to absorb distortion and unevenness of the inner peripheral surface of the steel pipe, it is not exclusive.

Preferably, the piston of the hydraulic cylinder 146 for advancing and retracting movement of the nozzle is provided with a clearance gauge (not shown).

Though, in the above mentioned embodiments, a single non-contact type cutting means is provided, a plurality of such cutting means may be provided in any directions to the advancing direction of the grinder cutter 142. The mounting position of the non-contact type cutting means is not limited by the above embodiments, but can be disposed above, below or at the same level as the grinder cutter means 108.

Furthermore, the cutting apparatus of the present invention can incorporate a horizontal grinder cutter having a large diameter near the inner diameter of the steel pipe, so that wear of the cutter generated by cutting operation of the junction joints from the inside of the steel pipe will give no defective influence on the cutting efficiency.

Particularly, the plasma arc cutter is easy to operate and the cutting speed thereof is high, permitting drastic reduction of cutting cost.

What is claimed is:

1. A method of cutting a steel pipe in the form of an erected interlocked steel pipe pile being consisted of a steel pipe and junction joints for interlocking neighboring steel piles which are attached on the outer surface of the pipe along the whole length thereof, comprising the steps of:
    inserting a plasma arc cutting means into the steel pipe to be cut, and
    cutting the steel pipe at a desired level by the cutting means, including the steps of:
    cutting at first the junction joints by mechanical cutting means; and then
    cutting the steel pipe body by the plasma arc cutting means.

2. A method of cutting a steel pipe as claimed in claim 1, wherein the plasma arc cutting means is operated to cut at the same level as the cutting line by the mechanical cutting means.

3. A method of cutting a steel pipe as claimed in claim 1, wherein the plasma arc cutting means is operated to cut at a desired level, and the method further comprises the step of vertically cutting the steel pipe so as to communicate the cutting line by the plasma arc cutting means with the cutting line by the mechanical cutting means.

* * * * *